Figure 9:
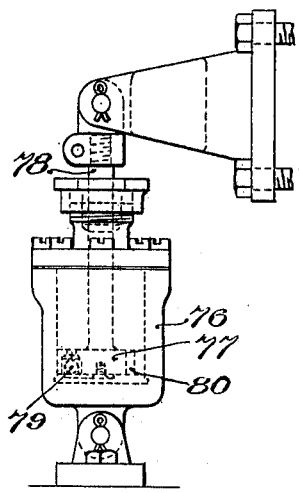

J. R. SCOTT.
LEATHER SKIVING MACHINE.
APPLICATION FILED SEPT. 23, 1907.

969,987.

Patented Sept. 13, 1910.
6 SHEETS—SHEET 1.

Witnesses
Edward S. Day
M. L. Gilman

Inventor
Jacob R. Scott
by his Attorneys
Phillips Van Everen & Fish

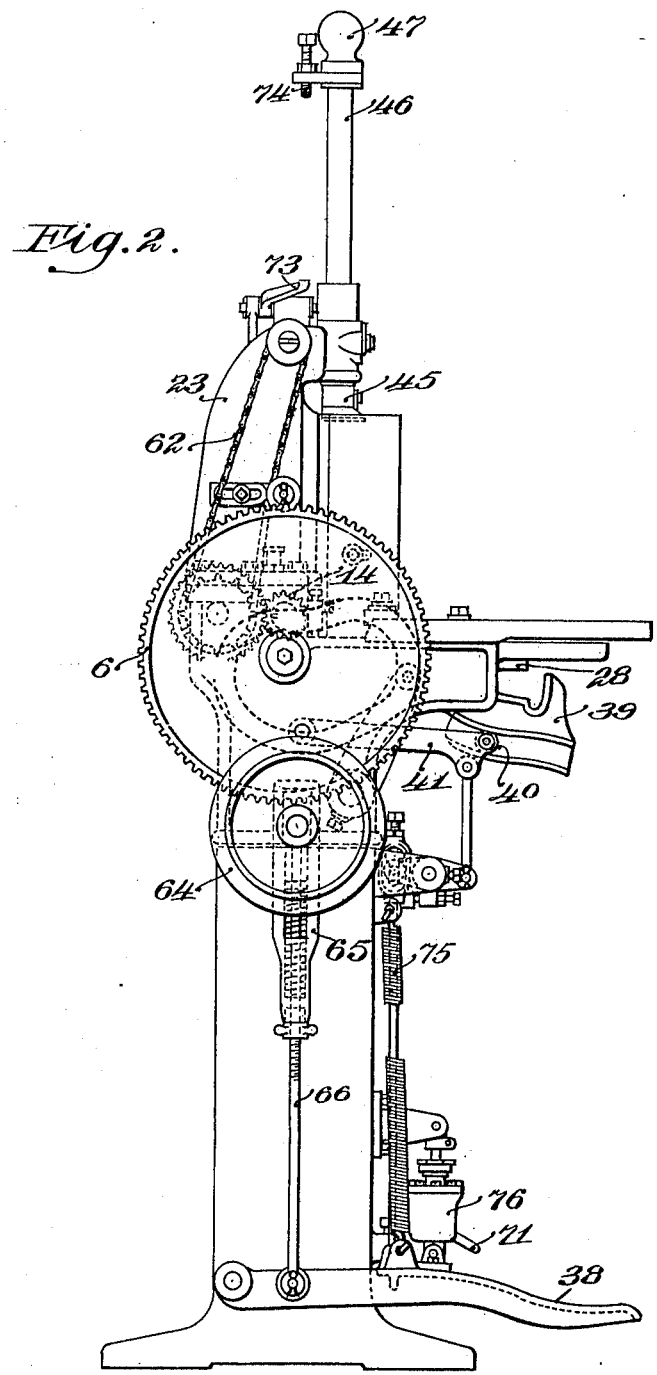

J. R. SCOTT.
LEATHER SKIVING MACHINE.
APPLICATION FILED SEPT. 23, 1907.
969,987.
Patented Sept. 13, 1910.
5 SHEETS—SHEET 3.
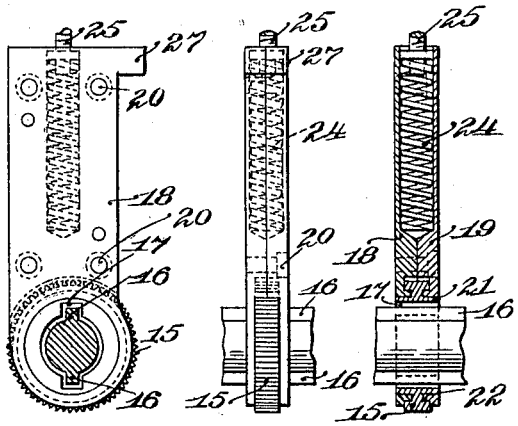
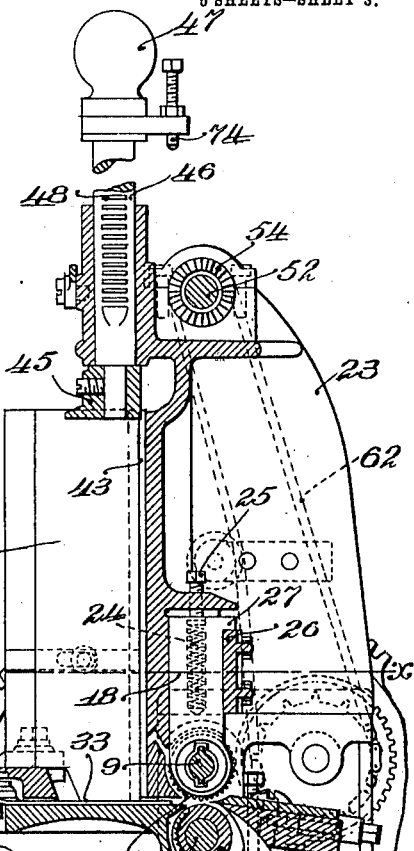
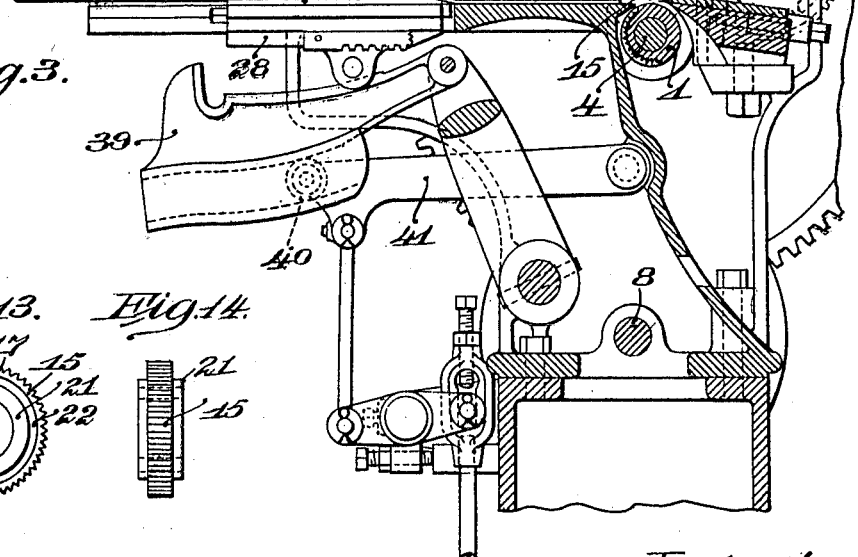
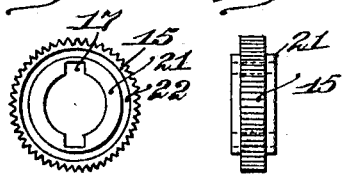
Witnesses
Edward S. Frey
M. L. Gilman
Inventor
Jacob R. Scott
by his Attorneys
Phillips Van Everen & Fish

J. R. SCOTT.
LEATHER SKIVING MACHINE.
APPLICATION FILED SEPT. 23, 1907.

969,987.

Patented Sept. 13, 1910.
5 SHEETS—SHEET 4.

Witnesses
Edward S. Day
M. B. Gilman

Inventor
Jacob R. Scott
by his Attorneys
Phillips Van Everen & Fish

J. R. SCOTT.
LEATHER SKIVING MACHINE.
APPLICATION FILED SEPT. 23, 1907.

969,987.

Patented Sept. 13, 1910.
5 SHEETS—SHEET 5.

Witnesses
Edward S. Day
M. L. Gilman

Inventor
Jacob R. Scott
by his Attorneys
Phillips Van Everen & Fish

UNITED STATES PATENT OFFICE.

JACOB R. SCOTT, OF BOSTON, MASSACHUSETTS, ASSIGNOR TO UNITED SHOE MACHINERY COMPANY, OF PATERSON, NEW JERSEY, A CORPORATION OF NEW JERSEY.

LEATHER-SKIVING MACHINE.

969,987.     Specification of Letters Patent.     Patented Sept. 13, 1910.

Application filed September 23, 1907. Serial No. 394,083.

*To all whom it may concern:*

Be it known that I, JACOB R. SCOTT, a citizen of the United States, residing at Boston, in the county of Suffolk and State of Massachusetts, have invented certain new and useful Improvements in Leather-Skiving Machines; and I do hereby declare the following to be a full, clear, and exact description of the invention, such as will enable others skilled in the art to which it appertains to make and use the same.

The present invention relates to leather skiving machines and particularly to machines for skiving articles of leather such as boot and shoe counters, box toe pieces and the like which comprise a die carrier provided with a die cavity of the shape of the article to be produced, a pressure roller for holding a blank in the die cavity and a skiving knife to act on the blank while held in the die cavity.

The invention is intended primarily as an improvement on the leather skiving machine disclosed in applicant's prior Patent No. 760,082, dated May 17, 1904, although the several features of the invention are not limited to use in any particular form of leather skiving machine.

One feature of the present invention consists in an improved pressure device for use in leather skiving machines to hold the work in position while it is being acted upon by the skiving knife. In the machine of the patent above referred to the pressure device consists of a roller provided with a yielding surface of rubber, which roller gives satisfactory results when the machine is used upon many grades of stock. The disadvantages of a pressure roller provided with a yielding surface of rubber are, however, that the rubber surface must be renewed from time to time, and especially when hard and dry stock is operated upon, the surface of the roller is often cut and injured and rapidly deteriorates. Also when such a roll is used in a machine of the class illustrated in the patent above referred to and hard and dry stock is operated upon, the pressure roller fails to hold the blank in position in the die cavity and force it against the skiving knife so as to cause the blank to be skived properly. To overcome the objections above noted, pressure rolls have been devised consisting of metallic disks arranged in close proximity to each other and so mounted as to be positively rotated and at the same time permitted to yield independently. The pressure device which constitutes a feature of the present invention is likewise provided with a series of positively driven metallic disks mounted to yield independently. The novel features of the device consist in the simplified and improved construction and arrangement of the various parts whereby the device is rendered more efficient in operation as well as more durable, and whereby it can be more readily assembled and placed in the machine. The novel features of this device will be particularly pointed out in the following specific description and claims and their advantages will be obvious to those skilled in the art when the construction and arrangement of the various parts of the device is understood.

The leather blanks which are used in machines of the class to which the present invention relates, and particularly the blanks for the different styles and sizes of box toe pieces, differ widely in shape. To enable these different shaped blanks to be fed accurately and with certainty to the die carrier and pressure roll without the use of a separate feed plate for each style or size of blank a feature of the present invention contemplates the provision of a feed slide provided with a central plate arranged to engage the rear portion of a blank and with a finger at each side of the central plate also arranged to engage the rear portion of the blank and adjustable to fit the shape of the blank being operated upon. The fingers may be adjustable in any desired manner but are preferably adjustable transversely to the direction of feed. This feed slide is designed particularly for use with box toe blanks. These blanks are sometimes unsymmetrical. To enable the fingers of the feed slide to be readily adjustable for operation upon symmetrical blanks, a device is preferably provided for connecting the fingers so that they can be adjusted simultaneously toward and from each other. This device however, is preferably removable in order that the fingers may be adjusted independently for operation upon unsymmetrical blanks. The feed slide, in addition to being capable of use with blanks of different shapes and sizes, also has the advantage of being particularly adapted to act on the toe portion or rounded end of a box toe blank, so that the blank can be fed to the skiving knife with the edge which is uppermost in the shoe in advance. This edge of the box toe piece is the edge which lies against the upper in the completed shoe and by presenting this edge first to the skiving knife accurate skiving of the edge to the desired thinness is insured. In machines which have heretofore been devised for skiving box toe blanks the blank has been presented to the skiving knife either with the rounded toe end or with the side of the blank in advance.

Another feature of the present invention relates to the mechanism for actuating the follower which presses upon the pile of blanks in the hopper and maintains the blanks in position to be fed successively to the die carrier and pressure roll. In the machine of the patent the follower is actuated in opposite directions by means of two bevel gears upon a longitudinally movable shaft which are brought alternately in mesh with a bevel gear connected through a pinion and rack to the rod on which the follower is secured. In the use of this mechanism it has been found that the teeth of the bevel gears are frequently damaged by the blows imparted thereto as either bevel gear on the longitudinal shaft is thrown into operation. In accordance with a feature of the present invention the follower is actuated alternately in opposite directions through suitable gearing by means of two gears mounted loosely upon the longitudinally movable shaft and held against longitudinal movement therewith, suitable clutches being provided, actuated by the longitudinal movement of the shaft, for alternately connecting the gears to the shaft. In the illustrated embodiment of this feature of the invention hereinafter described the gears upon the longitudinally movable shaft are bevel gears and the gearing between these bevel gears and the follower consists of a bevel gear, pinion and rack, as in the machine of the patent hereinbefore referred to. The three bevel gears remain constantly in mesh, and any liability of injuring the teeth of the gears when the shaft is moved longitudinally is effectually avoided.

Other features of the present invention will be referred to in connection with the specific description of the illustrated embodiment of the invention.

The several features of the present invention will be clearly understood from an inspection of the accompanying drawings in which—

Figure 1:
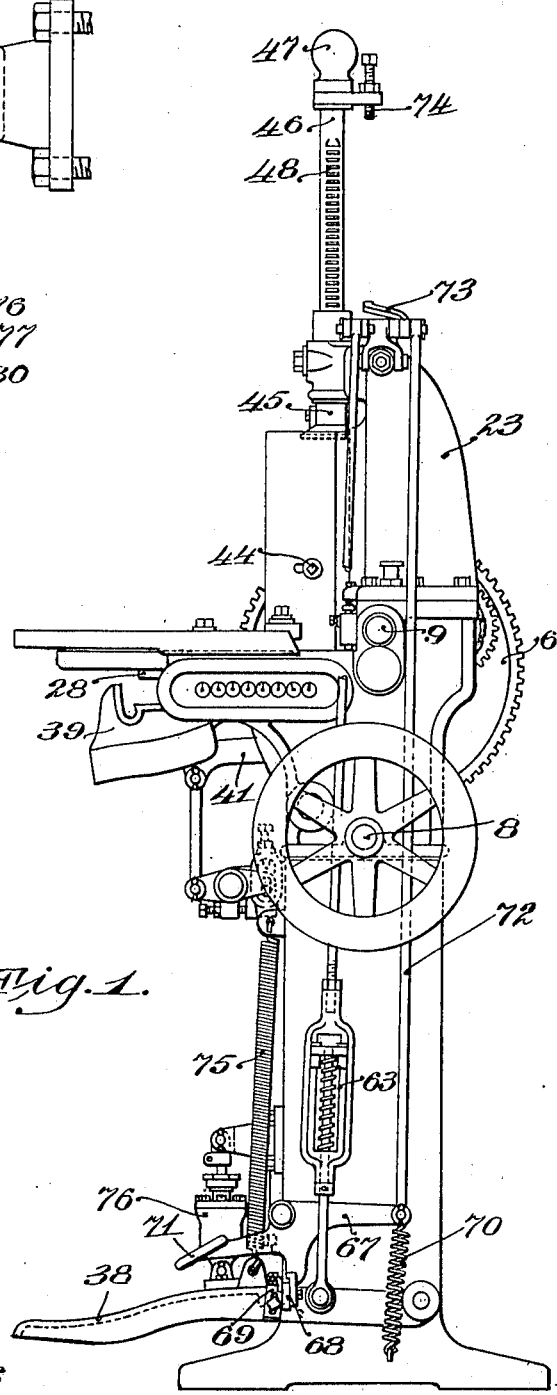
Figure 4:
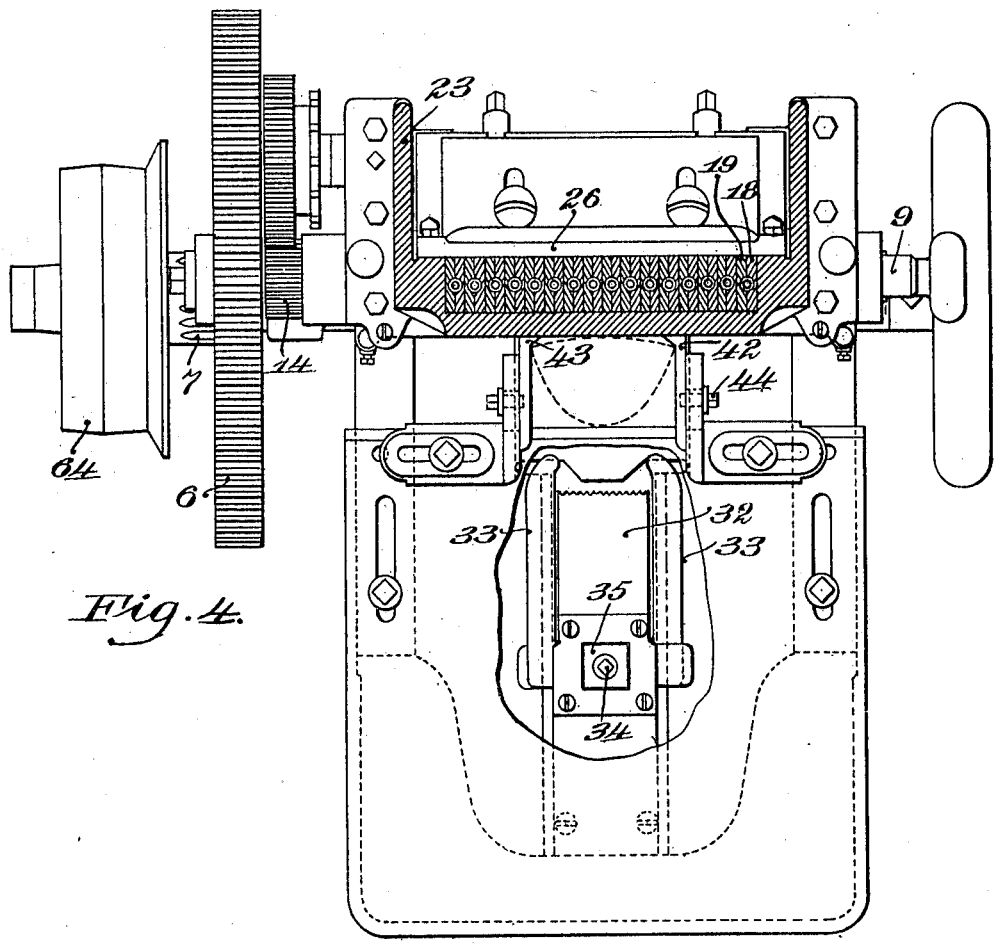
Figure 5:
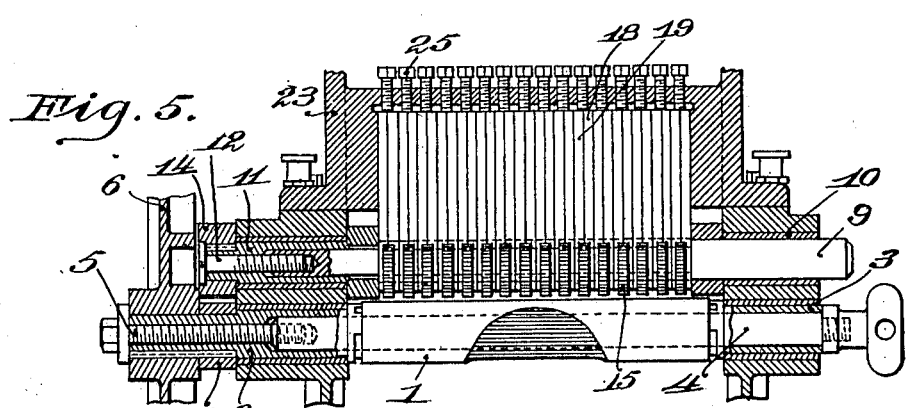
Figure 6:
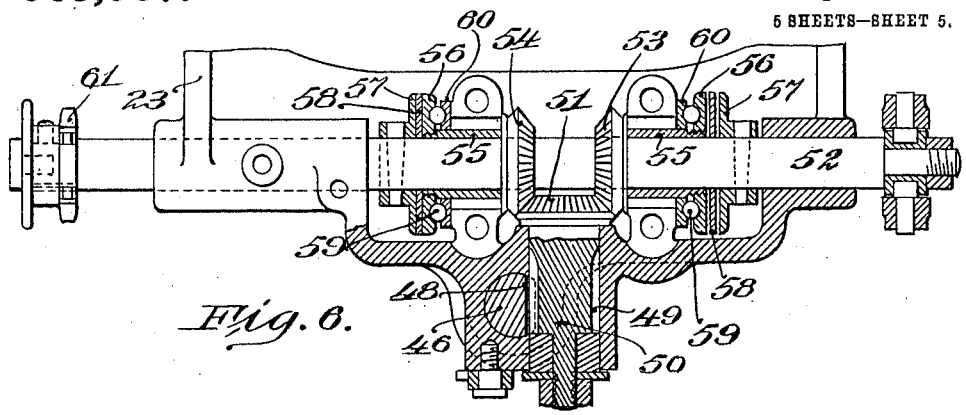
Figure 7:
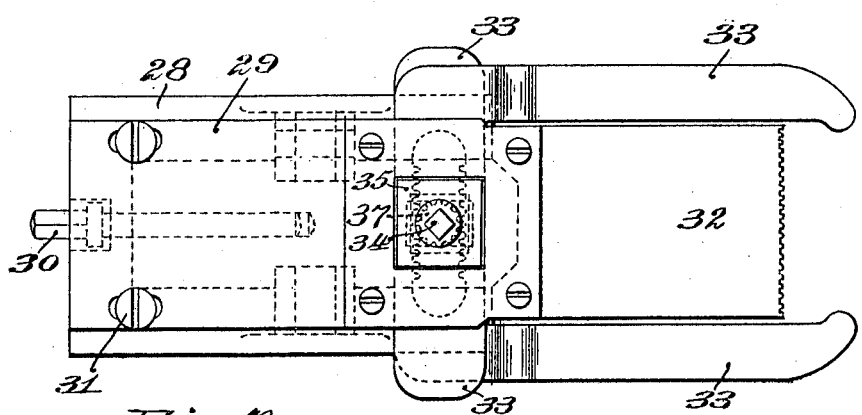
Figure 8:
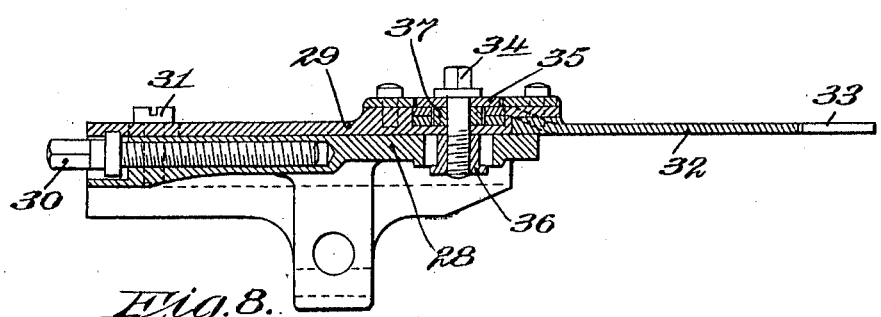

Figure 1 is a view in side elevation of a leather skiving machine embodying the same in their preferred form. Fig. 2 is a view of the opposite side of the machine to that shown in Fig. 1. Fig. 3 is a longitudinal sectional view of the upper portion of the machine. Fig. 4 is a sectional plan view on the line X—X of Fig. 3, with certain portions broken away to show underlying parts. Fig. 5 is a vertical cross sectional view illustrating particularly the construction of the pressure device and the parts associated therewith. Fig. 6 is a detail sectional plan view of the mechanism for actuating the follower. Fig. 7 is a plan view of the feed slide, Fig. 8 is a longitudinal sectional view of the parts illustrated in Fig. 7. Fig. 9 is a detail view in side elevation of a dash pot connected with the starting and stopping treadle, Fig. 10 is a view in end elevation of one of the disks which make up the pressure roll, together with the spring pressed slide in which it is journaled, the pressure roll shaft passing through the disk being shown in section. Fig. 11 is a view in rear elevation of the parts illustrated in Fig. 10. Fig. 12 is a central longitudinal section of the same parts. Fig. 13 is a view in end elevation of one of the disks of the pressure roll detached, and Fig. 14 is a view in front elevation of said disk.

The machine illustrated in the drawings is quite similar in the construction, arrangement and mode of operation of its various parts to the machine disclosed in the patent hereinbefore referred to, being provided with positively driven die and pressure rollers, a skiving knife the cutting edge of which extends close to the line of contact of the die and pressure rollers with the blank, a hopper to receive a pile of blanks, a reciprocating feed slide to feed the blanks successively to the die and pressure rollers, a follower to act on the pile of blanks in the hopper, and mechanism for actuating the follower to exert pressure on the pile of blanks and to raise the follower to permit a new supply of blanks to be placed in the machine.

The die roller, indicated at 1, is supported and actuated as in the patented machine, being held in position between the flanges of hollow shafts 2 and 3 by means of a shaft 4, passing through the hollow shaft 3, through the die roller and into the shaft 2, to which it is secured by a screw-threaded rod 5 mounted in the shaft 2. The shaft 2 is driven by means of a gear wheel 6 secured to the shaft, which meshes with a pinion 7 on the driving shaft 8. The pressure roll shaft, indicated at 9 is also secured in the machine and actuated as in the patented machine, said shaft passing through a hollow shaft or sleeve 10, through the disks of the pressure roll, and into a hollow shaft 11, to which it is secured by a screw-threaded rod 12. The hollow shaft 11 is rotated from the shaft 2 by means of intermeshing gears 13 and 14.

The improved pressure device of the machine illustrated in the drawings comprises a series of metallic disks 15 which in effect constitute a pressure roll. Each of these disks is provided with a central opening through which the pressure roll shaft 9 passes, the opening in the disk, however, being larger than the shaft so that the disk can move transversely with relation to the shaft. The disks are driven positively by the shaft and to this end the shaft is provided with diametrically disposed splines or ribs 16 which are received in radial slots 17 of the disks. Each disk is yieldingly pressed toward the die roller so that the disk forces the blank into the die cavity of the die roller in substantially the same manner as a pressure roller provided with a surface of rubber. The requisite amount of pressure is exerted upon each disk by means of a spring pressed slide in which the disk is journaled. For convenience of assembling, each slide is formed in two parts, 18 and 19, which are secured together by screws or pins 20. At their lower ends the slides are provided with openings to receive the disks 15, which are provided with laterally extending hubs 21 and grooves 22 engaging corresponding surfaces and ribs on the slides. This manner of mounting the disks in the slides permits the use of disks having comparatively wide peripheral surfaces which can hold the blank securely and firmly. The lower portions of the slides completely surround the hubs of the disks as indicated in Figs. 10, 11 and 12. The peripheral surface of the disks is toothed, and the portions of the slides surrounding the hubs of the disks provide surfaces which limit the extent to which the teeth penetrate the blank. These surfaces also act as strippers to remove the waste material which is skived from the upper surface of the blank. The slides are mounted in the bracket 23 of the machine frame so as to be capable of a vertical movement and are pressed downwardly by means of coiled springs 24 seated in the slides and engaged at their upper ends by adjusting screws 25 mounted in a projection from the bracket 23. The downward movement of the slides is limited by a cross bar 26 which is engaged by projections 27 on the slides extending over the cross bar. The slides are arranged side by side as indicated in Figs. 4 and 5 and are held in position by the cross bar 26 and by the walls of the recess formed in the bracket 23 to receive the slides.

The improved feed slide of the machine illustrated in the drawings comprises a block or carriage 28 mounted to slide in horizontal guideways in the frame of the machine as in the machine disclosed in the patent hereinbefore referred to. Upon the block 28 is mounted a plate 29 which can be longitudinally adjusted by means of an adjusting screw 30 and which is held in adjusted position by locking screws 31. To the forward end of the plate 29 is secured a thin plate 32 which is adapted to engage the lowermost blank in the hopper of the machine. Located at each side of the plate 32 is a finger 33, the forward end of which extends beyond the forward edge of the plate 32, as best shown in Figs. 4 and 7. These fingers are in the form of thin plates, and at their ends are provided with overlapping laterally extending portions which are received in a transverse guideway in the upper surface of the plate 29, so that the fingers can be adjusted laterally toward and from each other to fit the particular shape of blank which is to be skived. The laterally extending portions of the fingers 33 are slotted and the fingers are locked in adjusted position by means of a clamping bolt 34 and clamping plate 35. The clamping bolt 34 engages a nut 36 which is located in a longitudinal slot in the block 28 to permit the longitudinal adjustment of the plate 29 and the parts carried thereby. To cause the fingers 33 to be adjusted simultaneously a pinion 37 is loosely mounted upon the bolt 34 and engages racks cut on opposite sides of the slots in the overlapping portions of the fingers 33. By removing this pinion the fingers can be adjusted independently of each other.

The mechanisms for actuating the feed slide and for controlling its operation from the foot treadle 38 are substantially the same as the corresponding mechanisms of the machine of the patent hereinbefore referred to with the exception that the link 39 which engages the feed slide is provided with a slot which engages the roll 40 on the free end of the lever 41 so that the link is both raised and lowered by the connections from the foot treadle.

The hopper for the blanks is an improvemen on the hopper of the patented machine in that the side walls of the hopper are provided with removable plates 42 mounted thereon so as to be adjustable in the direction of feed and provided at their forward ends with inwardly projecting ledges 43. These plates are placed in the machine when box toe blanks are to be operated upon but are removed when the machine is used for skiving counter blanks. The plates 42 are locked in adjusted position by locking bolts 44 passing through the slots in the side walls of the hopper. The ledges 43 form stops for the ends of the box toe blanks and position the blanks properly as indicated in Fig. 4, in which figure a box toe blank is indicated in dotted lines. The adjustment of the plates 42 in the direction of feed permits the ledges to be set so as to engage blanks of different sizes and styles.

The follower which acts upon the pile of blanks in the hopper is indicated at 45 and is secured to the lower end of a rod 46 mounted in a vertical guideway in the bracket 23. The rod is provided with a weight 47 at its upper end and has formed in one side a series of rack teeth 48 which mesh with a pinion 49 upon a short horizontal shaft 50. At its rear end the shaft 50 is provided with a bevel gear 51 which is rotated alternately in opposite directions to raise and lower the follower. The mechanism so far described for actuating the follower is the same as that of the patented machine. In the patented machine a longitudinally movable shaft is provided having secured thereto two bevel gears which can be brought alternately into engagement with the bevel gear 51. In the machine illustrated in the drawings the longitudinally movable shaft, indicated at 52, is retained and also the two bevel gears, indicated at 53 and 54, for rotating the gear 51 alternately in opposite directions. The bevel gears 53 and 54 however, instead of being secured to the shaft so as to rotate and move longitudinally therewith are mounted loosely upon the shaft and are held against longitudinal movement with the shaft by bearings formed in the bracket 23. Both gears 53 and 54 are held constantly in mesh with the gear 51 and means are provided for alternately clutching the gears 53 and 54 to the shaft 52. To this end the hub or sleeve 55 of each gear is provided at its outer end with a clutch disk 56, and coöperating clutch disks 57 are secured to the shaft 52, between which disks and the disks 56 loose friction disks 58 are interposed. As will be apparent from an inspection of Fig. 6, a movement of the shaft 52 in one direction clutches the gear 53 to the shaft, and a movement of the shaft in the opposite direction clutches the gear 54 to the shaft. To take up the thrust of the clutches, antifriction balls 59 are inserted between the disks 56 and stationary disks 60 supported by the bearings on the bracket 23. The shaft 52 is provided at one end with a sprocket wheel 61 over which a sprocket chain 62 passes which sprocket chain is driven as in the machine of the patent hereinbefore referred to. Longitudinal movements are imparted to the shaft 52 from the treadle 38 in the same manner as in the patented machine with the exception that a yielding connection, indicated at 63 in Fig. 1, of well-known construction, is included in the connections to the treadle.

In addition to the novel constructions hereinbefore described, the machine illustrated in the drawings accompanying this application differs from the machine of the patent above referred to in the following particulars. The driving shaft of the machine is provided with a belt pulley 64 and with a friction clutch for connecting the pulley to the driving shaft, which clutch is controlled from the foot treadle 38 by means of a sliding block 65 yieldingly mounted upon the upper end of a rod 66 connected to the treadle. A latch 67 is provided to lock the foot treadle 38 in depressed position, a projection 68 of the latch lever being swung over a block 69 on the treadle by the action of a spring 70 connected to the latch when the treadle is depressed. The latch lever is provided with a treadle 71 by means of which it can be depressed by the operator whenever it is desired to stop the machine. So stop the machine automatically when the blanks in the hopper are nearly exhausted, the latch lever 67 is connected by a rod 72 to one end of a lever 73 pivoted upon the upper portion of the bracket 23, and the other end of the lever 73 is extended into the path of movement of an adjustable screw 74 mounted on the upper end of the rod to which the follower 45 is secured. The treadle when released is forcibly raised by coiled springs 75, and to deaden the shock produced by the upward movement of the treadle and prevent injury to the treadle and to the mechanism actuated thereby a dash pot, the construction of which is illustrated in Fig. 9 is applied to the treadle. This dash pot consists of a cylinder 76 pivotally connected to the treadle, and provided with a piston 77 which is connected by a piston rod 78 to the column of the machine. The upper end of the cylinder is closed and the piston rod passes through a suitable packing box. The cylinder is filled with oil and the piston is provided with one or more ball valves 79 and one or more holes 80 whereby the upward movement of the treadle is retarded as will be obvious without further description.

The operation of the machine illustrated in the drawings will be readily understood without a detailed description thereof. It may be stated, however, that when the foot treadle is depressed the shaft 52 is first moved to disconnect the bevel gear 54 from the shaft 52 so that the follower is allowed to drop by gravity upon the pile of blanks, and thereafter the belt pulley 64 is connected to the driving shaft, the feed slide is connected to its actuating mechanism and the bevel gear 53 is clutched to the shaft 52. The treadle is locked in its depressed position by the latch lever 67, and while the treadle remains depressed the frictional clutch connecting the shaft 52 and gear 53 tends to rotate the gear and force the follower 45 against the pile of blanks in the hopper. As soon as the foot treadle is released the feed slide is disconnected from its actuating mechanism and the shaft 52 is moved in a direction to clutch the gear 54 to the shaft 52. The block 65 which controls the friction clutch between the belt pulley 64 and the driving shaft is so arranged that when the treadle rises the clutch continues to transmit sufficient power to the driving shaft to cause the shaft 52 to be rotated until the follower 45 is raised to its highest position after which the added resistance of the friction clutch connecting the shaft 52 and gear 54 brings the driving shaft to rest.

The nature and scope of the present invention having been indicated and the preferred form having been specifically described, what is claimed is:—

1. A leather skiving machine, having, in combination, a series of pressure disks, a carrier for each disk comprising separable parts provided with journals for the disk, means for yieldingly supporting the carriers, a rotary shaft passing through the disks, and connections between the shaft and disks for rotating the disks while permitting the disks to move transversely to the shafts.

2. A leather skiving machine, having, in combination, a series of pressure disks, a series of independently movable carriers in which the disks are journaled provided with stripping surfaces between the disks in position to remove a skiving from the disks, means for yieldingly supporting the carriers, a rotary shaft passing through the disks, and connections between the shaft and disks for rotating the disks while permitting the disks to move transversely to the shafts.

3. A leather skiving machine, having, in combination, a die, a pressure device, a skiving knife, and a feed slide for feeding blanks to the die and pressure device, provided with a central plate mounted thereon arranged to engage the rear portion of a blank and with a finger at each side of the central plate also mounted on the feed slide and arranged to engage the rear portion of a blank, said fingers being normally stationary with relation to the central plate and adjustable to fit the shape of the blank being operated upon.

4. A leather skiving machine, having, in combination, a die, a pressure device, a skiving knife, and a feed slide provided with a central plate mounted thereon arranged to engage the rear portion of a blank and with a finger at each side of the central plate also mounted on the feed slide and arranged to engage the rear portion of a blank, said fingers being normally stationary with relation to the central plate and means for adjusting the fingers simultaneously toward and from each other to fit the shape of the blank being operated upon.

5. A leather skiving machine, having, in combination, a die, a pressure device, a skiving knife, and a feed slide provided with a central plate arranged to engage the rear portion of a blank and with a laterally adjustable finger at each side of the central plate also arranged to engage the rear portion of a blank and a device connecting the fingers to cause them to be adjusted simultaneously, said device being removable to enable the fingers to be adjusted independently.

6. A leather skiving machine, having, in combination, a die, a pressure device, a skiving knife, a feed slide provided with a central plate arranged to engage the rear portion of a blank and with a finger at each side of the central plate also arranged to engage the rear portion of the blank, means for relatively adjusting the fingers laterally to fit the shape of the blank being operated upon and means for adjusting the central plate and fingers in the direction of feed.

7. A leather skiving machine, having, in combination, a hopper to receive a pile of blanks, a follower acting on a pile of blanks in the hopper to maintain the blanks in position to be fed successively therefrom, and mechanism for actuating the follower alternately in opposite directions comprising a longitudinally movable shaft, two gears mounted loosely upon the shaft, mechanism connecting the gears and follower to actuate the follower in opposite directions and suitable clutches acting to connect one of said gears to the shaft when the shaft is moved in one direction and to connect the other gear to the shaft when the shaft is moved in the opposite direction.

8. A leather skiving machine, having, in combination, a hopper to receive a pile of blanks, a follower acting on a pile of blanks in the hopper to maintain the blanks in position to be fed successively therefrom, and mechanism for actuating the follower alternately in opposite directions comprising a longitudinally movable shaft, two oppositely disposed bevel gears mounted loosely upon the shaft and held against longitudinal movement therewith, a bevel gear meshing with both bevel gears on the shaft, connections between said last mentioned bevel gear and the follower for actuating the follower and friction clutches acting when the shaft is moved in opposite directions to connect the first mentioned bevel gears alternately to the shaft.

9. A leather skiving machine, having, in combination, a hopper to receive a pile of blanks, plates mounted upon the side walls of the hopper and provided with inwardly projecting ledges to form stops for the ends of the blanks and means for adjusting said plates in the direction of feed.

In testimony whereof I affix my signature, in presence of two witnesses.

JACOB R. SCOTT.

Witnesses:
EDITH C. HOLBROOK,
BERNARD BARROWS.